(12) United States Patent
Ward

(10) Patent No.: US 6,644,180 B1
(45) Date of Patent: Nov. 11, 2003

(54) CORN CUTTING ASSEMBLY

(76) Inventor: Lena Ward, 1101 Drumcastle Ave., Kingsport, TN (US) 37660

( * ) Notice: Subject to any disclaimer, the term of this patent is extended or adjusted under 35 U.S.C. 154(b) by 0 days.

(21) Appl. No.: 10/431,776

(22) Filed: May 8, 2003

(51) Int. Cl.[7] .............................. A23L 1/00; A47J 17/00; A47J 17/16; A23N 15/02; A01F 11/06
(52) U.S. Cl. ........................... 99/567; 99/537; 99/492; 30/121.5; 460/51; 460/48
(58) Field of Search ..................... 99/337, 338, 492, 99/537, 567, 514, 586, 589; 30/121.5, 316, 283; 83/167, 267, 733, 932; 460/51–54, 56, 45, 48, 17

(56) References Cited

U.S. PATENT DOCUMENTS

| | | | |
|---|---|---|---|
| 53,849 A | 4/1866 | McGill | |
| 222,974 A | * 12/1879 | Wood | ............... 99/567 |
| 235,253 A | * 12/1880 | Kanne | ............... 99/567 |
| 439,582 A | 10/1890 | Thompson | |
| 890,449 A | 6/1908 | Petteway | |
| 1,127,548 A | * 2/1915 | Turner | ............... 460/17 |
| 1,801,192 A | * 4/1931 | Dandridge | ............... 99/567 |
| 2,063,483 A | * 12/1936 | Bulmer | ............... 460/51 |
| 2,282,660 A | * 5/1942 | Lee | ............... 99/567 |
| 2,326,873 A | 8/1943 | Meek | |
| 2,447,301 A | * 8/1948 | Wright | ............... 30/283 |
| 2,518,302 A | * 8/1950 | Gerber | ............... 56/13.3 |
| 2,566,568 A | * 9/1951 | Ives | ............... 460/17 |
| 2,609,852 A | 9/1952 | Houldsworth | |
| 2,998,833 A | * 9/1961 | Kosmerl | ............... 99/567 |
| 3,077,909 A | 2/1963 | Trenor | |
| 4,753,159 A | * 6/1988 | Eaton | ............... 99/567 |
| 4,892,034 A | * 1/1990 | Miles | ............... 99/567 |
| 6,305,276 B1 | * 10/2001 | Backus | ............... 99/514 |
| 6,463,845 B1 | 10/2002 | Thomas | |

* cited by examiner

Primary Examiner—Timothy F. Simone
(74) Attorney, Agent, or Firm—Susan F. Johnston

(57) ABSTRACT

Disclosed herein is an assembly for cutting kernels or corn from an ear of corn comprising:

a) a container having an open top, an enclosed bottom, a front side, and a rear side, said front side defining a front slit extending from the top of the container to a point near the bottom of the container, said rear side defining a rear slit corresponding to said front slit so that a cutting plane extending through both slits transects the top and bottom of the container;

b) a lid positionable atop of said container, said lid defining an orifice eccentrically transected by the cutting plane; and c) a concave pedestal attached to the bottom of said container transected by the cutting plane and adapted to stabilize the tip end of the ear of corn when it is held in an upright position in the container.

13 Claims, 3 Drawing Sheets

CORN CUTTING ASSEMBLY

FIELD OF THE INVENTION

The present invention relates to devices for cutting corn kernels from an ear of corn.

BACKGROUND OF THE INVENTION

It is well known that the seasonal task of cutting kernels of corn away from ears of corn for freezing, canning, or cooking often proves to be messy and somewhat dangerous. During a typical corn cutting operation, the work area quickly becomes sticky and messy due to stray kernels and corn juices. Of further concern is the inherent danger associated with using a sharp knife to perform a slippery, tedious, and often voluminous, chore. Thus, it is the object of the present invention to provide a corn cutting device that contains stray kernels and juices during a corn cutting operation. It is a further object of the present invention to reduce or eliminate danger posed by the knife during cutting.

BRIEF SUMMARY OF THE INVENTION

The corn cutting assembly of the present invention includes a container having an open top, an enclosed bottom, a front side, and a rear side. The front side defines a front slit therein having a width and a length extending from the top of the container to a point near the bottom of the container. The rear side defines corresponding rear slit so that a cutting plane extending through both the front slit and the rear slit transects the top and bottom of the container. The assembly further includes a lid positionable atop the container. The lid defines an orifice having a circular corn-receiving region eccentrically transected by the cutting plane. The assembly still further includes a concave pedestal connected to the bottom of the container and adapted to stabilize the tip end of the ear of corn when the ear of corn is held in an essentially upright position in the container. The assembly optionally includes a knife adapted so that the blade of the knife is movable in the cutting plane. The assembly further optionally includes an impaler suitable for piercing and holding the stalk end of the ear of corn in an essentially upright position near the orifice of the lid during a corn cutting operation.

DETAILED DESCRIPTION

Figure 1:
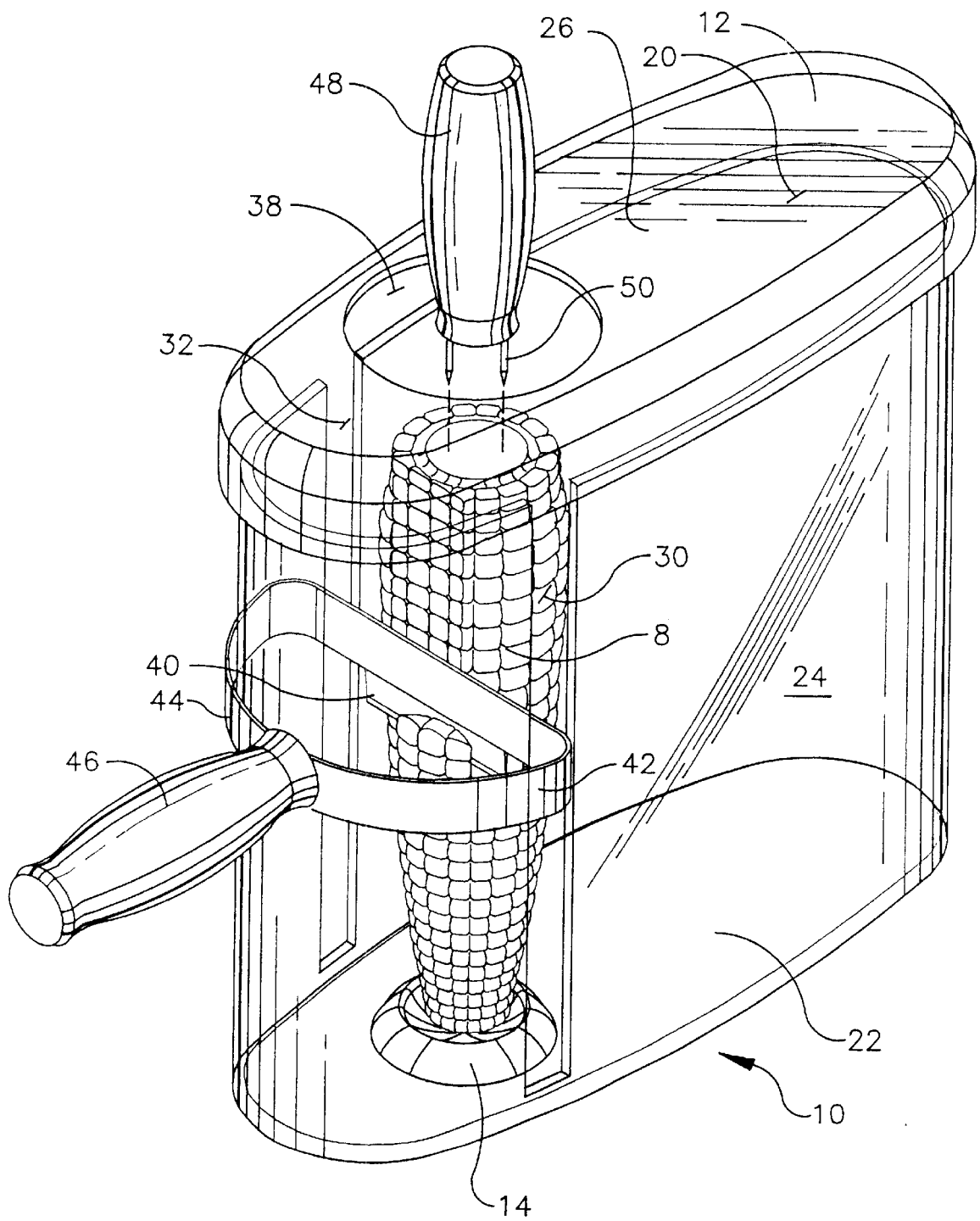
FIG. 1 illustrates an isometric view of the fully assembled corn cutting assembly having a semi-annular shaped "safety" knife component.
Figure 2:
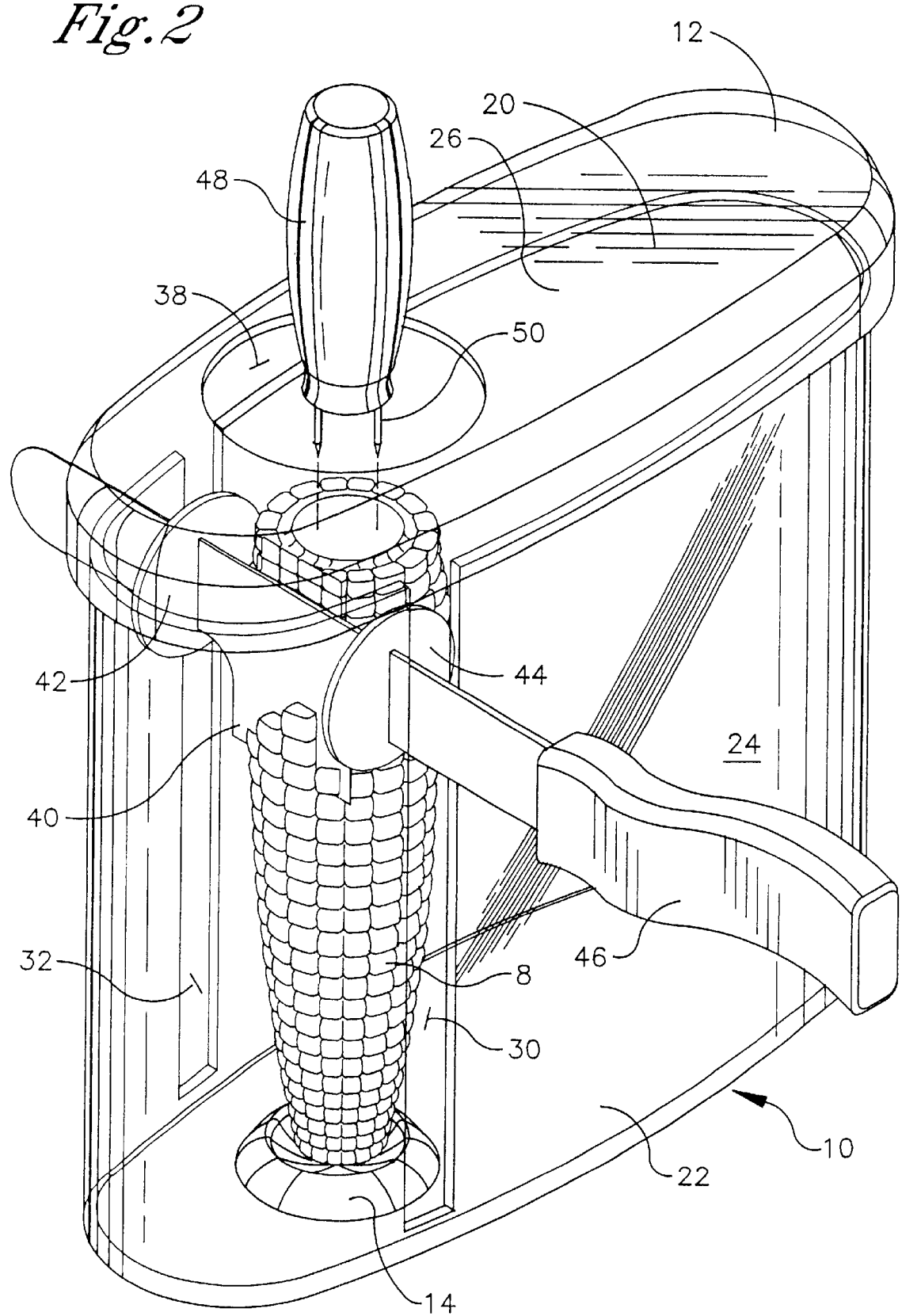
FIG. 2 illustrates an isometric view of the fully assembled corn cutting assembly having a linear "safety" knife component.
Figure 3:
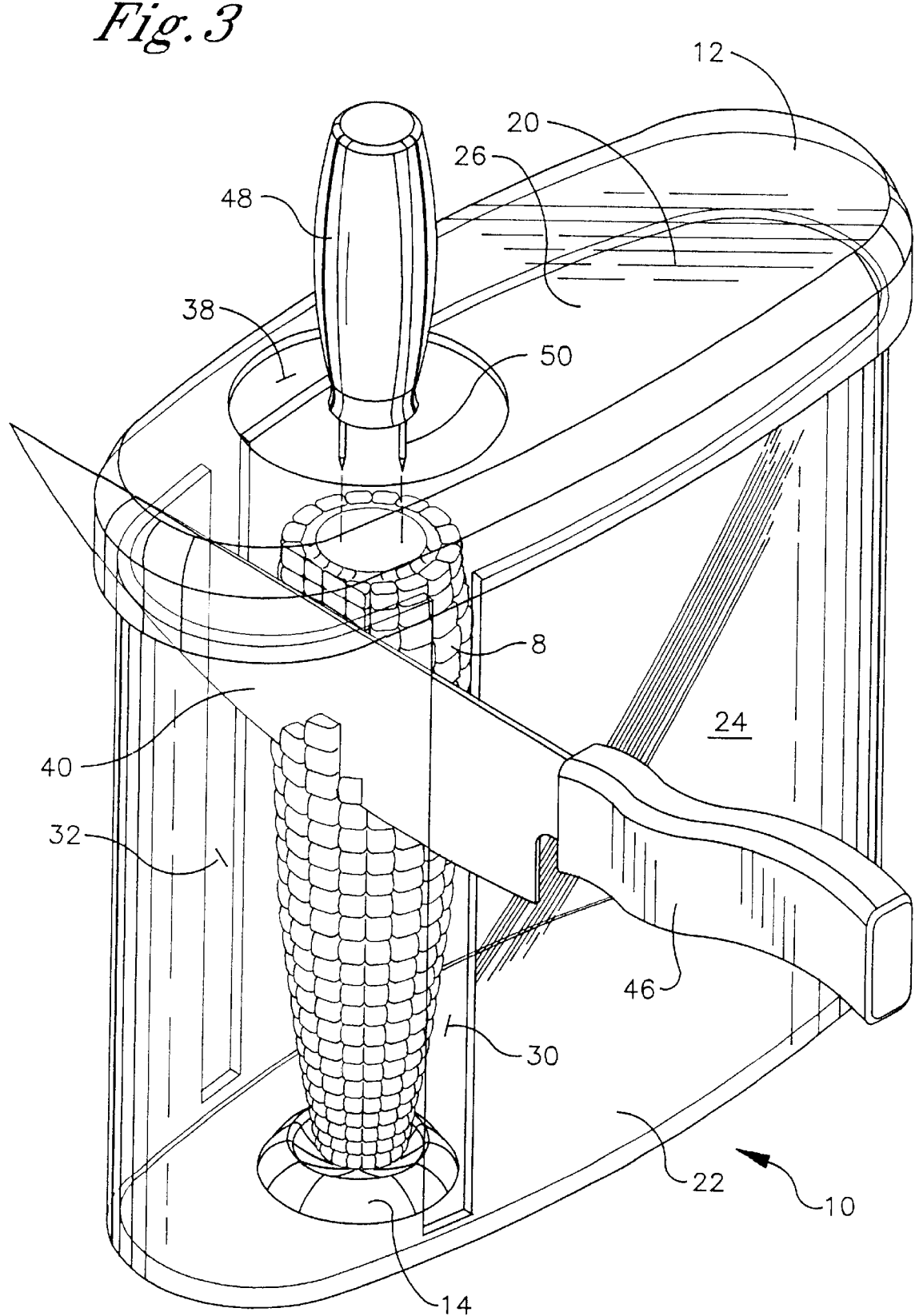
FIG. 3 illustrates an isometric view of the fully assembled corn cutting assembly having a traditional straight utility knife.

The present invention is a corn cutting assembly that provides a method of safely and cleanly cutting corn kernels from an ear of corn in an efficient manner while the ear of corn 8 is in an upright position, preferably with the smaller "tip" end of the ear disposed below the larger "stalk" end. As shown in FIGS. 1–3, the main components of the corn cutting assembly of the present invention include a container 10, a lid 12 adapted to matingly fit on the top of the container, a concave pedestal 14, preferably a knife, and preferably a cob impaler.

The container 10 of the assembly has an open top 20, an enclosed bottom 22, a front side 24, and a rear side 26. The front side 24 defines therein a front slit 30 having a width and length extending, preferably perpendicularly, from the top 20 of the container to a point near the bottom 22 of the container. The rear side 26 defines a corresponding rear slit 32 having a width and length extending from the top 20 of the container to a point near the bottom 22 of the container. The front and rear slits are positioned opposite each other so that a single cutting plane extends through both slits. The length of the front and back slits are preferably longer than the length of the ear of corn 8. The width of the front and back slits is preferably between about 0.5 to 2.0 inches, with a 1.0 to 1.5 inch wide slit being most preferable.

The overall height of the container is preferably tall enough so that the entire ear of corn may be disposed inside the container. A height between about 6 and 16 inches is more preferable, with a height of between 10 to 12 inches being most preferable. The container may be any useful shape such as oblong, rectangular, or round.

The lid 12 defines an orifice 38 having a circular corn-receiving region that is eccentrically (off-centered) transected by the cutting plane when positioned atop the container so that the kernels to be cut from the ear of corn may be easily positioned in the cutting plane while the ear of corn is positioned at a slight angle to the cutting plane, if needed. As can be seen, the orifice 38 is adapted to unobstructedly receive an entire ear of corn 8 transversely through the corn-receiving region. The orifice is preferably circular and is preferably slightly larger than the maximum diameter of the corn-receiving region, or diameter of the ear of corn, so as to allow for tilting of the ear of corn during the cutting operation. A suitable diameter for the orifice is between about 2.5 to about 4.5 inches, more preferably about 3.0 to 4.0 inches.

The concave pedestal 14 is disposed inside the container and attached atop of the container bottom 24 so as to be transected by the cutting plane. The concave pedestal is adapted to loosely receive the smaller tip end of the ear of corn 8 so that the corn is stabilized laterally inside the container during cutting, as shown. The concave pedestal 14 is preferably integrally formed with the bottom 22 of the container.

The container is preferably plastic. The sides of the container are preferably made from a clear plastic, so that the user can see the cutting action. Since the concave pedestal must be hard enough to withstand repeated infliction of cutting action from the knife, the pedestal is most preferably formed from a hard non-porous material. Suitable materials will be apparent to those of ordinary skill in the art and include natural stone, hard polymers, and composites.

As is apparent, the corn cutting assembly is intended for use with a knife. Thus, the assembly preferably includes a knife component including a blade 40 controllably connected to a handle 46. FIG. 3 illustrates an embodiment of the present assembly wherein a common straight kitchen knife is used for cutting the corn. The embodiment in FIG. 3 effectively contains the corn kernels and juices, and also reduces the likelihood of accidental knife cuts.

FIGS. 1–2 illustrate preferred embodiments wherein the knife is specially constructed to preclude the transverse withdrawal of the blade 40 through the front slit 30 or the rear slit 32 of the container. Thus, the knife is adapted with at least two oppositely acting safety stops, a pushing stop 42 that obstructs travel of the blade beyond the rear slit 32, and a pulling stop 44 that obstructs travel of the blade beyond the front slit 30. At least one of the safety stops is disposed between the blade and the handle. FIG. 1 illustrates the use of a semi-annular knife design having two safety stops disposed between the blade and the handle and FIG. 2 illustrates the use of a straight knife design having one safety stop between the blade and the handle. It will become apparent that the two safety stops can be located on the knife in several different arrangements to achieve the same goal. In a first arrangement, the two stops are located adjacently against each side of the front slit 30. In a second arrangement, the two stops are located adjacently against each side of the rear slit 32. In a third arrangement, illustrated in FIG. 1, the pushing stop 42 is located adjacently outside of the front slit 30 and the pulling stop 44 is adjacently outside of the rear slit 32. In a fourth arrangement, illustrated in FIG. 2, the pushing stop 42 is located adjacently inside of the real slit 32 and the pulling stop 44 is adjacently inside of the front slit 30. The knife is adapted so that the blade 40 is movable up and down in the cutting plane when the two safety stops are appropriately positioned with the container 10. The knife component further includes a handle 46 adapted for providing leverage to the blade 40, as is traditional with knives.

For illustration purposes, each of FIGS. 1–3 show a container wherein the cutting plane, and thus the knife, is located at the side of the ear of corn that is proximate to an end of the container. However, in practice, it is preferable for the cutting plane to be located at the side of the ear of corn that is most distal from a container end so that the kernels of corn have a larger area in which to create a pile on the bottom of the container. Thus, the corn-receiving region of the orifice of the lid would lie substantially between the cutting plane and that end of the container. As can be seen, the position of the orifice of the lid and the concave pedestal are dependent upon the position of the cutting plane.

The corn cutter assembly of the present invention preferably further includes a corn cob impaler suitable for piercing and holding and rotating the larger, stalk end of the ear of corn 8 in an essentially upright position near the orifice of the lid while the smaller, tip end of the corn ear is stabilized in the concave pedestal during use. As shown in FIGS. 1–3, the impaler has a handle 48 attached to at least one prong 50, preferably a plurality of 2 to about 6 prongs adapted for piercing the stalk end of the corn cob.

As shown in the drawings, with the knife and lid positioned on the container and the impaler inserted in the stalk end of the ear of corn (or using alternative means for holding the ear of corn), the assembly is used by inserting an ear of corn through the orifice of the lid so that the smaller end of the ear of corn is stabilized by the concave pedestal. The kernels are then cut off of the ear of corn as the user moves the knife up and down, thus moving the blade through the cutting plane. The kernels and expressed juices from the ear of corn are neatly collected into the bottom of container. Thus, it should be apparent that the corn cutting assembly of the present invention provides a cutting operation that is both cleaner and safer than previous devices.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An assembly for cutting kernels of corn from an ear of corn, the ear of corn having a stalk end and a tip end, said assembly comprising:

a) a container having an open top, an enclosed bottom, a front side, and a rear side, said front side defining a front slit therein having a width and a length extending from the top of the container to a point near the bottom of the container, said rear side defining therein a rear slit corresponding to said front slit so that a cutting plane extending through both said front slit and said rear slit transects the top and bottom of the container;

b) a lid positionable atop of said container, said lid defining an orifice having a circular corn-receiving region eccentrically transected by the cutting plane; and c) a pedestal attached to the bottom of said container, said pedestal having an upper surface defining a concave area therein transected by the cutting plane and adapted to stabilize the tip end of the ear of corn when the ear of corn is held in an upright position in the container.

2. The corn cutting assembly according to claim 1 further including a knife having a blade controllably connected to a handle, said knife adapted so that the blade is movable in the cutting plane.

3. The corn cutting assembly according to claim 2 wherein said knife includes a pair of oppositely acting safety stops adapted for obstructing transverse travel of said blade through said front slit and rear slit when said knife is positioned inside the container.

4. The corn cutting assembly according to claim 3 wherein at least one of said pair of safety stops is disposed between the blade and the handle.

5. The corn cutting assembly according to claim 1 wherein said container has an end between said front side and said rear side, said cutting plane is located at a position proximate to said end, and the corn-receiving region of said lid lies substantially between said end and said cutting plane.

6. The corn cutting assembly according to claim 1 further comprising an impaler suitable for piercing and holding the stalk end of the ear of corn in an essentially upright position near the orifice of the lid.

7. The corn cutting assembly according to claim 6 wherein said impaler includes a handle attached to at least one prong.

8. The corn cutting assembly according to claim 1 wherein said pedestal is an integral part of the bottom of said container.

9. The corn cutting assembly according to claim 1 wherein said container is formed from a clear, hard plastic.

10. An assembly for cutting kernels of corn from an ear of corn, the ear of corn having a stalk end and a tip end, said assembly comprising:

a) a container having an open top, an enclosed bottom, a front side, and a rear side, said front side defining a front slit therein having a width and a length extending from the top of the container to a point near the bottom of the container, said rear side defining therein a rear slit corresponding to said front slit so that a cutting plane extending through both said front slit and said rear slit transects the top and bottom of the container;

b) a lid positionable atop of said container, said lid defining an orifice having a circular corn-receiving region eccentrically transected by the cutting plane;

c) a pedestal attached to the bottom of said container, said pedestal having an upper surface defining a concave area therein transected by the cutting plane and adapted to stabilize the tip end of the ear of corn when the ear of corn is held in an upright position in the container;

d) a knife having a blade controllably connected to a handle, said knife adapted so that the blade is movable in the cutting plane; and e) an impaler suitable for piercing and holding the stalk end of the ear of corn in an essentially upright position near the orifice of the lid.

11. The corn cutting assembly according to claim 10 wherein said knife includes a pair of oppositely acting safety stops adapted for obstructing transverse travel of said blade through said front slit and rear slit when said knife is positioned inside the container.

12. The corn cutting assembly according to claim 11 wherein at least one of said pair of safety stops is disposed between the blade and the handle.

13. The corn cutting assembly according to claim 10 wherein said pedestal is an integral part of the bottom of said container.

* * * * *